United States Patent [19]

Ogino et al.

[11] Patent Number: 5,105,280
[45] Date of Patent: Apr. 14, 1992

[54] IMAGE FORMING DEVICE WHICH CAN FORM AN IMAGE BY PRINTING A PLURALITY OF PIXEL UNIT AREAS WHICH ARE COMPOSED OF MULTIPLE SUB PIXELS

[75] Inventors: Shigeo Ogino; Yoshihiko Hirota, both of Osaka, Japan

[73] Assignee: Minolta Camera Kabushiki Kaisha, Osaka, Japan

[21] Appl. No.: 462,729

[22] Filed: Jan. 9, 1990

[30] Foreign Application Priority Data

Jan. 12, 1989 [JP] Japan .................................. 1-6762
Jan. 12, 1989 [JP] Japan .................................. 1-6765

[51] Int. Cl.⁵ .......................... H04N 1/21; H04N 1/40
[52] U.S. Cl. ................................. 358/298; 358/459; 358/466
[58] Field of Search ............... 358/298, 456, 457, 458, 358/459, 460, 429, 466

[56] References Cited

U.S. PATENT DOCUMENTS

| | | | |
|---|---|---|---|
| 4,717,964 | 1/1988 | Abe et al. | 358/298 X |
| 4,800,442 | 1/1989 | Riseman et al. | 358/298 X |
| 4,814,886 | 3/1989 | Kuge et al. | 358/298 |
| 4,903,123 | 2/1990 | Kawamura et al. | 358/75 |
| 4,924,301 | 5/1990 | Surbrook | 358/456 X |
| 4,933,776 | 6/1990 | Ikeda | 358/298 X |
| 4,958,239 | 9/1990 | Yamada et al. | 358/298 X |

FOREIGN PATENT DOCUMENTS

| | | |
|---|---|---|
| 57-76977 | 5/1982 | Japan . |
| 59-161982 | 9/1984 | Japan . |
| 61-61566 | 3/1986 | Japan . |
| 61-118069 | 6/1986 | Japan . |
| 61-214666 | 9/1986 | Japan . |
| 2145598 | 3/1985 | United Kingdom . |

Primary Examiner—Benjamin R. Fuller
Assistant Examiner—Eric Frahm
Attorney, Agent, or Firm—Burns, Doane, Swecker & Mathis

[57] ABSTRACT

An image forming device which can form an image by printing a plurality of dots based on an image information that contains a plurality of density data corresponding to a plurality of pixels defined by the fractionalization of the original image, and which can express the density of an image by controlling the number of dots to be printed within a predetermined tone unit area. The image forming device includes a threshold pattern generator for generating a threshold pattern which is a repetition of a basic pattern including a predetermined number "L" of thresholds, a comparator for comparing respective density data with a predetermined number "M" of thresholds selected from all "L" of the thresholds in which "L" is not an integer multiple of "M", and for producing a predetermined number "M" of print data corresponding to the respective density data; and a printer for printing on a printing sheet dots corresponding to the "M" print data in a line along a main scanning direction.

9 Claims, 11 Drawing Sheets

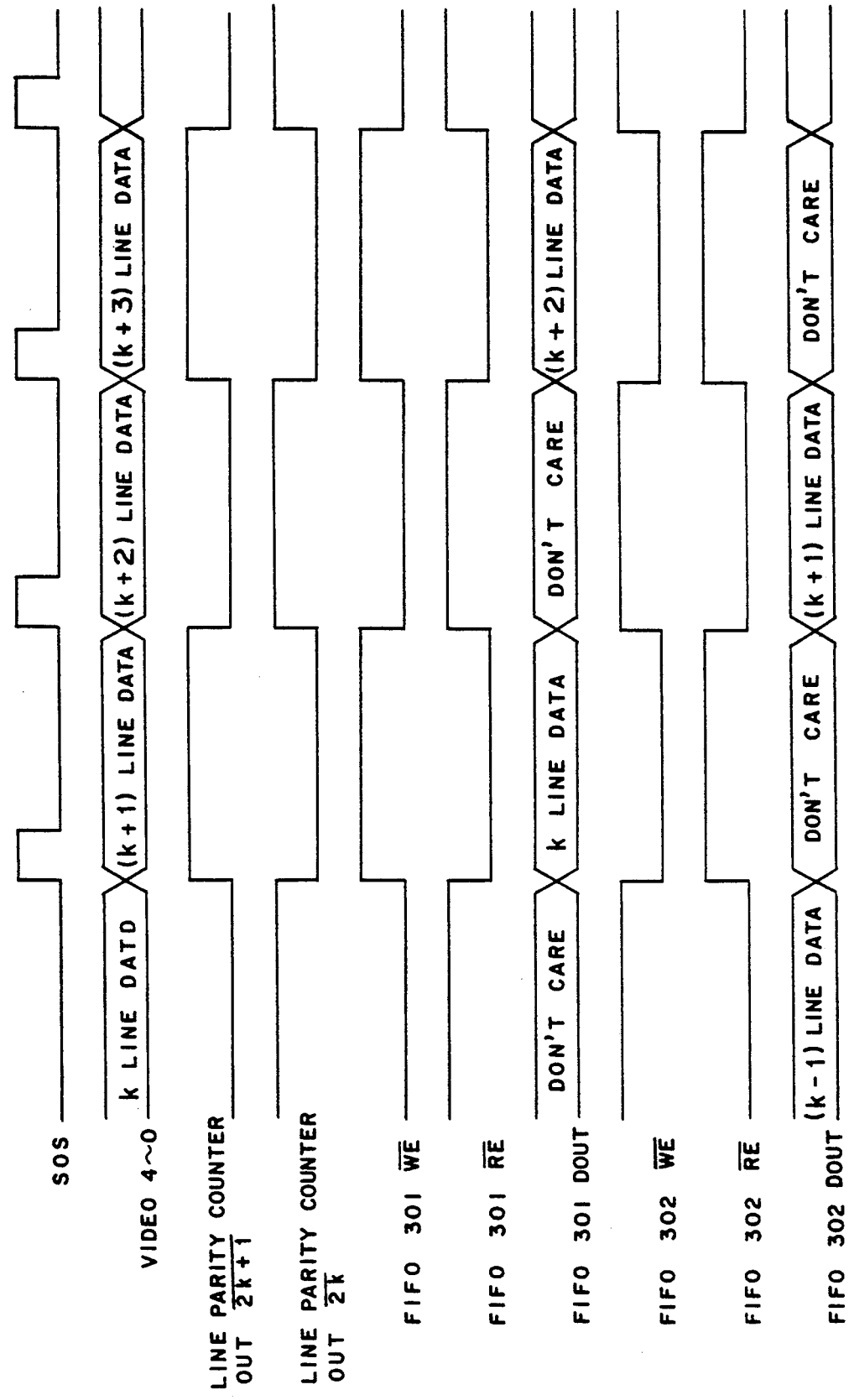

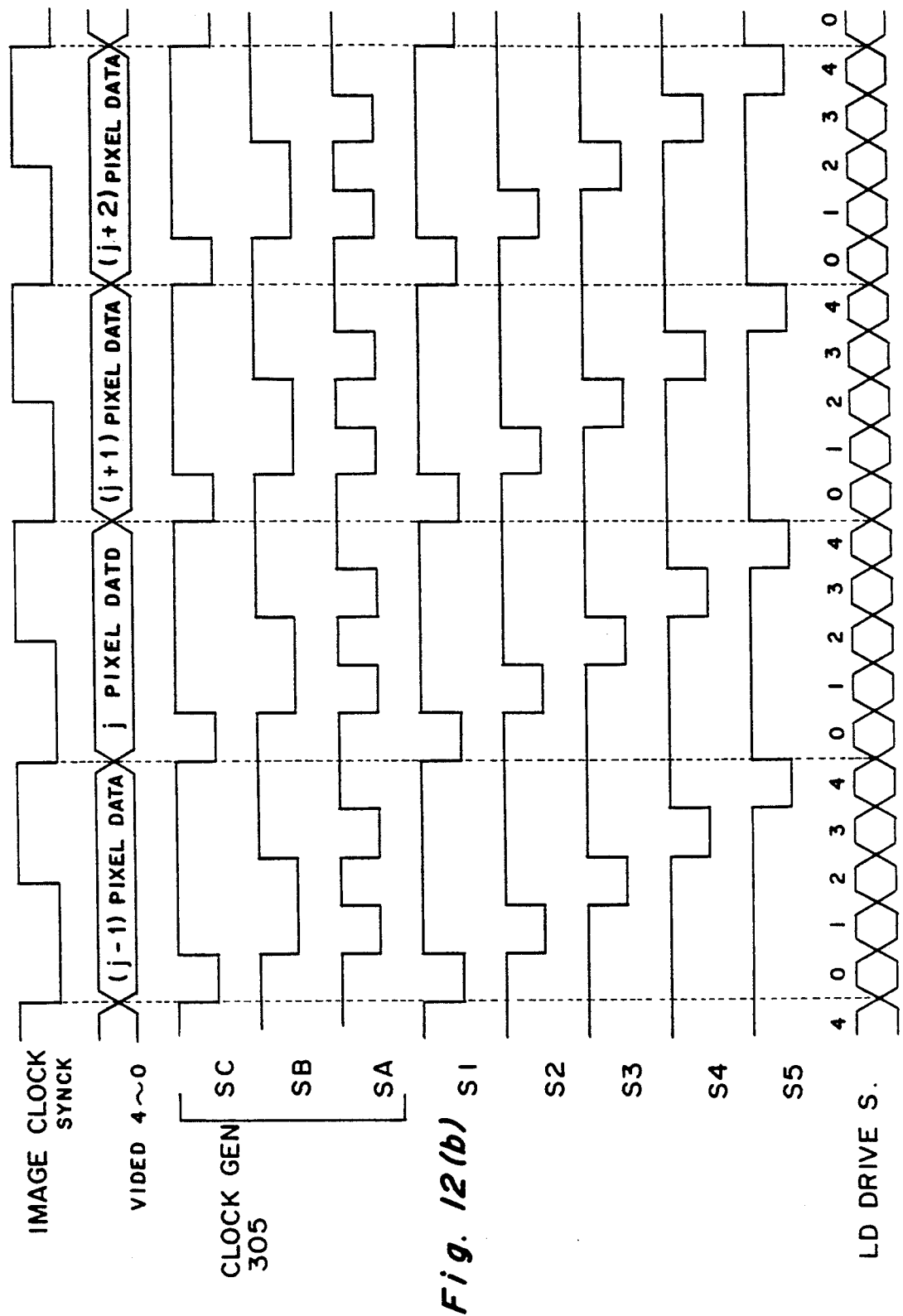

IMAGE FORMING DEVICE WHICH CAN FORM AN IMAGE BY PRINTING A PLURALITY OF PIXEL UNIT AREAS WHICH ARE COMPOSED OF MULTIPLE SUB PIXELS

BACKGROUND OF THE INVENTION

1. Field of the Invention

The present invention relates to an imaging device which creates half-tone reproductions of an original image using an area gradation method by assigning multiple dots to each single pixel.

2. Description of the Prior Art

In digitally controlled CRT displays, printers, and copying machines, images are formed by serial dot arrays (output pixels) comprising displayed and non-displayed dots.

Two methods are commonly used in this type of device to reproduce gradations in the tonal density of the original image, specifically density gradation in which the size and toner density of the dots are changed, and area gradation in which the number of dots within a single unit area is changed according to the density of the original image. Of these two methods, area gradation methods, typically density pattern processing and dithering, are the most commonly used due to their relative ease of control.

In density pattern processing, each pixel (input pixel), i.e., the smallest readable unit of the original image during the imaging process, consists of a dot matrix comprised of multiple dots, and the density pattern best suited to accurately reproducing the density of the original is selected from among a number of predetermined density patterns, thereby determining the specific series of dots in the dot matrix to be used. While this makes it possible to produce optimized half-tone images, this method also requires a large capacity memory area to store all possible density patterns.

In dithering, one dot is assigned to each single pixel, and each pixel is digitized based on a variable level threshold value. This method is suited to applications in which the pixel size is small, as in high resolution imaging processes based on a digital signal produced from high resolution scanning of the original image.

Systematic dithering, in which the dither data group (dither matrix) of regularly changing values is repeated, is used most frequently. With this method, only one dither matrix needs to be provided, and large capacity memory devices and complex processing circuits are not required.

However, because the dither matrix area representing a single half-tone unit area in the processed image represents multiple pixels, the resolution of the image reproduced according to the resolution used when scanning the original image is eventually low, and as the dither matrix area is increased to increase the number of half-tones, the overall image resolution decreases further.

As a result, conventional imaging devices use an area gradation method combining dithering with density pattern processing. In this process, when a dither matrix area is assigned to multiple pixels, the number of half-tones can be increased without increasing the dither matrix area by assigning multiple dots to each single pixel in the dither matrix for a single unit area of the original image.

For example, in the device described in U.S. Pat. No. 4,814,886, a series of (m) dots long is assigned to each single pixel; a dither matrix comprised of $(a \times a \times m)$ threshold data values is assigned to each $(a \times a)$ pixel area with (a) pixels in the main scanning direction and (a) pixels in the sub-scanning direction, thus forming half-tone reproductions with $(a \times a \times m + 1)$ half-tones (a case when the number of display dots is 0 is counted as one tone) in the tone unit area.

In a conventional imaging device, the dither matrix area, i.e., the half-tone unit area, corresponds to a specific integer number of pixels. Thus, when the pixel density varies in the lateral and longitudinal directions in order to fractionalize the original image, the half-tone unit areas in the lateral and longitudinal directions of the reproduced image are not of equal density, and a large difference in the resolution in the lateral and longitudinal directions results.

Therefore, in a digital camera, for example, differences in the image quality of the photographed image will occur even with the same original due to the direction of the original table.

In addition, in a conventional imaging device, display dots are added one at a time to one side of a single display dot referred to as the nucleus of growth through the imaging area (which is equal to $(m \times a)$ dots in the dither matrix area, i.e., the area of one horizontal matrix) as the density of the original image increases. As a result, the dot which is the minimum threshold data (i.e., the growth nucleus) and the dot which is the maximum threshold data are adjacent within the $(m \times a)$ threshold data group corresponding to the area covered by the dither matrix. Thus, when images are formed by repeating the dither matrix, a specific edge pattern is regularly formed by the above adjacent dots, and problems result in the reproducibility of the original image.

SUMMARY OF THE INVENTION

The present invention has been developed with a view to substantially solving the above described disadvantages and has for its essential object to provide an improved image processing device which minimizes the difference in lateral and longitudinal resolution in the reproduced image even if the pixel density of the original image differs in the lateral and longitudinal directions.

In accomplishing these and other objects, an image forming device according to the present invention can form an image by printing a plurality of dots based on an image information that contains a plurality of density data corresponding to a plurality of pixels defined by the fractionalization of the original image, and which can express the density of an image by controlling the number of dots to be printed within a predetermined tone unit area, in which image forming device comprises:

a threshold pattern generating means for generating a threshold pattern which is a repetition of a basic pattern including a predetermined number (L) of thresholds;

a comparing means for comparing respective density data with a predetermined number (M) of thresholds selected from all (L) of the thresholds in which (L) is not an integer multiple of (M), and for producing, based on the comparison result, a predetermined number (M) of print data corresponding to the respective density data; and printing means for printing on a printing sheet dots corresponding to said (M) print data in a line along a main scanning direction.

According to the preferred embodiment, multiple dots arrayed in series are assigned to each single pixel used to divide the original image.

The tone unit area is a dot matrix of L×n dots where L is the number of dots in the lateral (horizontal) direction and n is the number of dots in the longitudinal (vertical) direction. The memory device stores at least one threshold data group comprised of L×n threshold data. This threshold data group is the standard for the array of display data in the tone unit area.

The comparator compares the one threshold datum read from the memory device with the density data of one pixel in the original image, and outputs a binary signal.

By repeating this process for each pixel, half-tone reproductions are created by increasing the number of adjacent display dots one at a time on alternate sides of a single "nucleus" dot in the image area corresponding to L dots in the tone unit area as the density of the original image increases.

According to an alternative embodiment of the present invention, m dots arrayed in series are assigned to each single pixel used to fractionalize the original image.

The tone unit area is a dot matrix of L×n dots where L is the number of dots in the lateral (horizontal) direction and n is the number of dots in the longitudinal (vertical) direction; L is selected as a value which is not an integral multiple of the value m, and the values m, L, and n are selected as values by which the tone unit area will be an approximate square.

The memory device stores at least one threshold data group comprised of L×n threshold data; this threshold data group is the standard for the array of display data in the tone unit area.

The comparator compares the one threshold datum read from the memory device with the density data of one pixel in the original image, and outputs a binary signal.

As a result, half-tone images in which the resolution in the lateral and longitudinal directions is approximately equal can be formed.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 12a and 12b are timing charts of the image data processor.

DETAILED DESCRIPTION OF THE PREFERRED EMBODIMENTS

Figure 6:
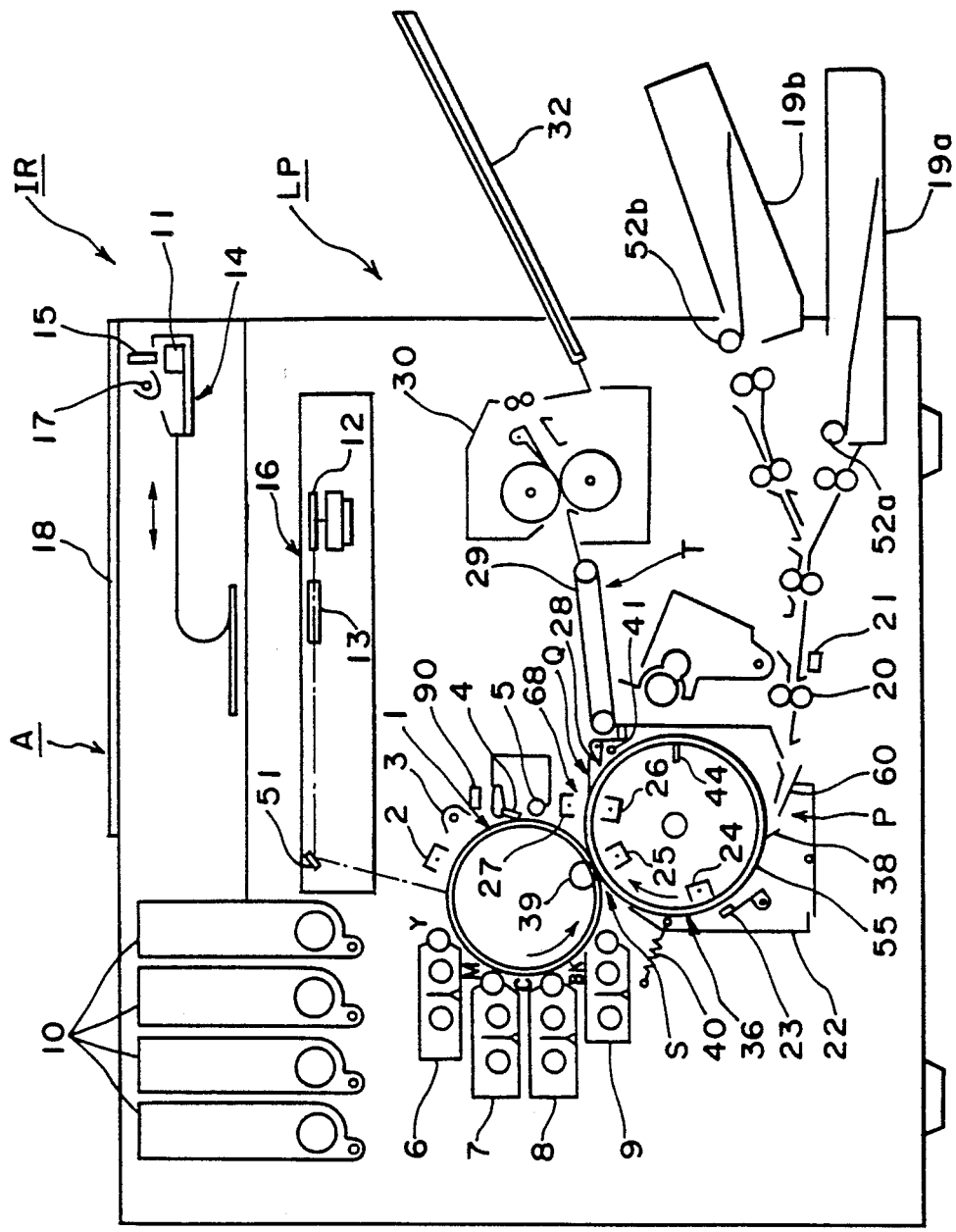
FIG. 6 is a front cross section showing the simplified construction of a digital photocopier.

Referring to FIG. 6, a front-view cross section of a digital photocopier A employing the imaging device of the present invention is shown.

Digital photocopier A includes an image reader section IR which processes the pixel signals produced by reading the original image and outputs an image signal as the result of this process, and a laser printer section LP which produces a color image using an electrophotographic process based on the image signal sent from the image reader IR.

In the image reader IR, using exposure lamp 17, rod lens array 15, and image sensor 11, the original placed on the original glass 18 is read for producing three color signals R, G and B representing the three primary colors, red, green and blue. These R,G and B signals are converted, by a color correction circuit 105 as will be described later, into three or four types of signals, specifically Y (yellow), M (magenta), and C (cyan) signals or these three Y, M and C signals plus Bk (black) signal. These signals are process in various steps to produce an imaging signal which is applied to laser printer LP which is provided with a laser optical system 16.

The digital photocopier A according to the present invention is not provided with image memory areas for the three color components. Thus, as the image reader unit 14 scans the original to read each of the primary color data separately, the Y, M and C signals or Y, M, C and Bk signals are sent successively to the laser printer LP.

The laser optical system 16 of the laser printer LP has a polygonal mirror 12 for scanning, a lens 13 of focal length F, reflection mirror 51, and other components. The laser optical system 16 transmits laser beam to the photoconductive drum 1 for each color based on the Y, M and C signals or Y, M, C and Bk signals.

The photoconductive drum 1 is driven in the counter-clockwise direction. The surface of the photoconductive drum 1 is applied with an organic photosensitive construction having a charge generator layer and a charge carrier layer laminated on a conductive substrate. The surface has particularly high sensitivity to laser beams with an approximately 780 nm wavelength.

A drum cleaner 4, toner disposal roll 5, eraser lamp 3, and charger 2 are installed around the photoconductive drum 1 together with four types of developers. The first developer 6 is filled with yellow toner, the second developer 7 with magenta toner, the third developer 8 with cyan toner, and the fourth developer 9 with black toner. The toner in each of these developers is charged negative. Toner is supplied as required from toner hopper 10 through pipes (not shown) carrying the toner to the developers 6, 7, 8, and 9 based on a toner supply signal.

The stock of transfer sheets (copy paper), which may be plain paper, overhead projector film, or other medium, is stored in paper feed cassettes 19a, 19b, and is fed from the cassette, one sheet at a time, by paper feed rollers 52a, 52b. When the leading edge of the paper reaches the registration roller 20, the transfer sheet is stopped temporarily. This makes it possible to properly time the following copying procedure and to adjust for any paper skew. The paper sensor 21 is used for this purpose. The transfer drum 36 is driven clockwise, and multiple checking claws 38 are provided around the drum. These checking claws 38 check the leading edge of the copy paper transferred by registration roller 20 at predetermined timing sequence.

The frame 22 supporting the transfer drum 36 is rotatably supported by stud 41, and is forced in the counterclockwise direction about stud 41 by the urging force of spring 40. This causes transfer drum 36 to be pressed to positioning roller 39 positioned at the side of photoconductive drum 1, thereby holding a predetermined gap between the transfer drum 36 and the photoconductive drum 1. This gap is preferably selected between 0.05 mm to 0.70 mm.

Provided along the inner surface of transfer drum 36 are absorption charger 24, transfer charger 25, and the first eraser charger 26. Provided along the outer surface of the transfer drum 36 are ground terminal 23 in opposition to the absorption charger 24 and a second eraser charger 27 opposite the first eraser charger 26. A jam detector 90 is also provided at the separation claw Q to detect the occurrence of any transfer paper misfeeds at the separation claw 28. A reflective photosensor is well suited as a jam detector 90.

The absorption charger 24 releases a negatively charged corona, causing the conductive screen 55 of the transfer drum 36 to be negatively charged so that the copy paper, which is fed with the leading edge checked to the transfer drum 36 by the checking claws 38, is electrostatically attracted to the conductive screen 55. The ground terminal 23 contacts the copy paper at this time to negate the effects of the absorption charger 24 on the copy paper and to assure positive electrostatic adhesion of the copy paper to the transfer drum 36.

The transfer charger 25 is located at transfer area S where the photoconductive drum 1 and transfer drum 36 are in closest proximity. By releasing a positive corona discharge, the transfer charger 25 causes the toner image on the photoconductive drum 1 to be electrostatically transferred to the transfer drum 36.

An AC voltage is applied to first eraser charger 26 and second eraser charger 27, and these two chargers combined form an eraser charger 68. The first eraser charger 26 is used primarily to erase the conductive screen 55 and reduce the electrostatic attraction of the transfer sheet; and the second eraser charger 27 is used primarily to erase the charge from the transfer sheet surface during separation from the drum to prevent the discharge and scattering of the image accompanying separation.

The copy paper separated by the separation claw 28 from the transfer drum 36 is carried to the fixing section 30 by the sheet transport section T consisting of a conveyor and other components. The image is heat fixed in the fixing section 30, and is then ejected to the eject tray 32. The reference position for the rotation of transfer drum 36 is detected by position detector sensor 44.

Figure 7:
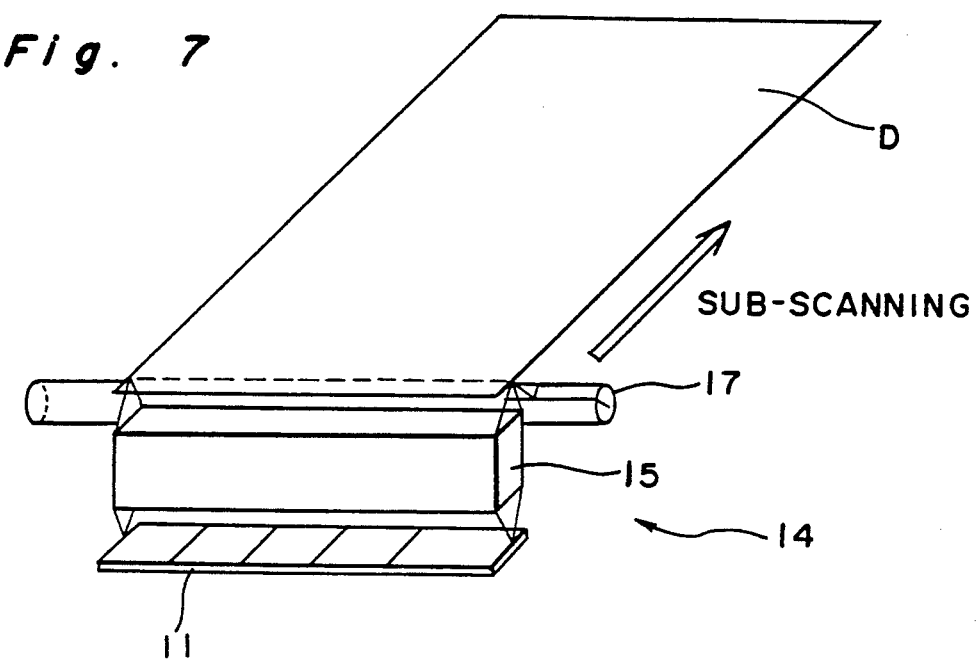
FIG. 7 is an oblique overview of the image reader unit.
Figure 8:
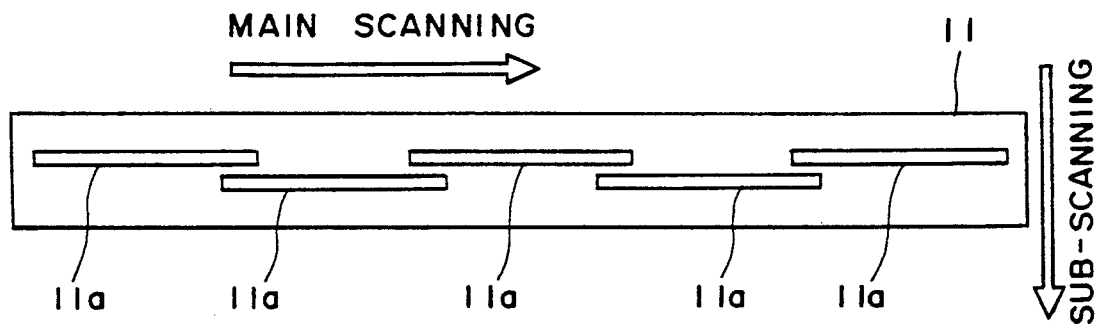
FIG. 8 is a plane figure of the image sensor.
Figure 9:
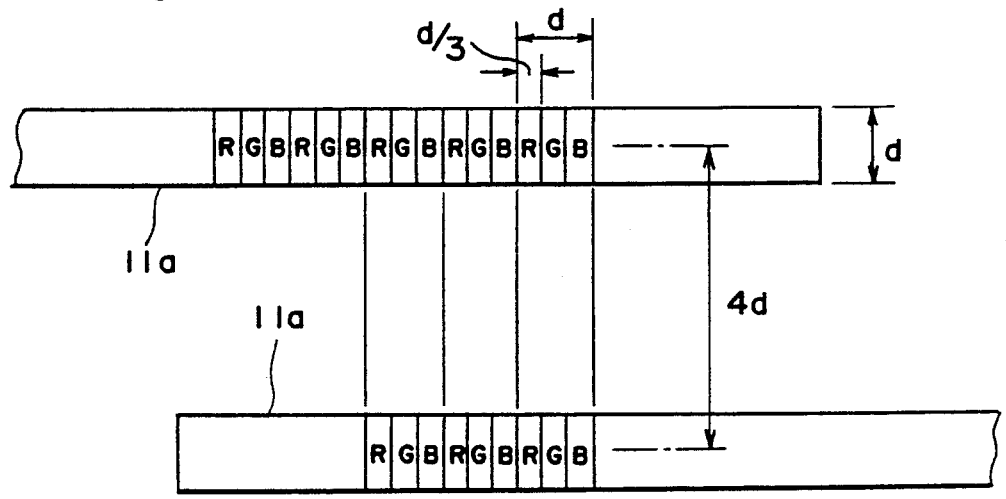
FIG. 9 is an enlarged view of the CCD sensor chip in FIG. 8.

Referring to FIGS. 7, 8 and 9, there are shown respectively, a perspective simplified view of the image reader unit 14, a layout of the image sensor 11, and an enlarged view of the CCD sensor chip 11a shown in FIG. 8.

The image reader unit 14 is equipped with image sensor 11 and line-scans the original D set on a glass plate 18 in the sub-scanning direction.

As shown in FIG. 8, five contact type CCD sensor chips 11a are arrayed on image sensor 11 continuously in the horizontal (main scanning) direction and in a zigzag pattern at an even pitch in the longitudinal (sub-scanning) direction. Because there is a predetermined distance between the front group chips and the back group chips in the sub-scanning direction, there is a delay before the output signal is produced from the back group CCD sensor chips 11a, but such a delay is compensated for by delaying the output signal from the front group CCD sensor chips 11a.

As shown in the enlarged view of the edge of the CCD sensor chip 11a in FIG. 9, each CCD sensor chip 11a is arrayed with a series of multiple elements each being square with 62.5 $\mu$m (1/16 mm) sides.

Each element is divided into three sections, and each section is provided with a filter to receive only one of the three primary colors R, G and B.

Each element thus corresponds to one pixel of the many pixels into which the original image is subdivided when scanned, and the photoelectric conversion output of one element thus expresses the density of the corresponding pixel. Therefore, the resolution in the main scanning direction when the original D is scanned by the image sensor 11 is 16 pixels per millimeter.

On the other hand, the resolution in the sub-scanning direction is determined by the scanning speed. In the present embodiment, because the original is thus scanned at least three times to scan each primary color, the scanning speed in each sub-scanning direction is increased in order to shorten the time required to form a full-color copy image. Thus, the resolution in the sub-scanning direction is 12 pixels/mm, and is therefore lower than the resolution in the main scanning direction.

Figure 10:
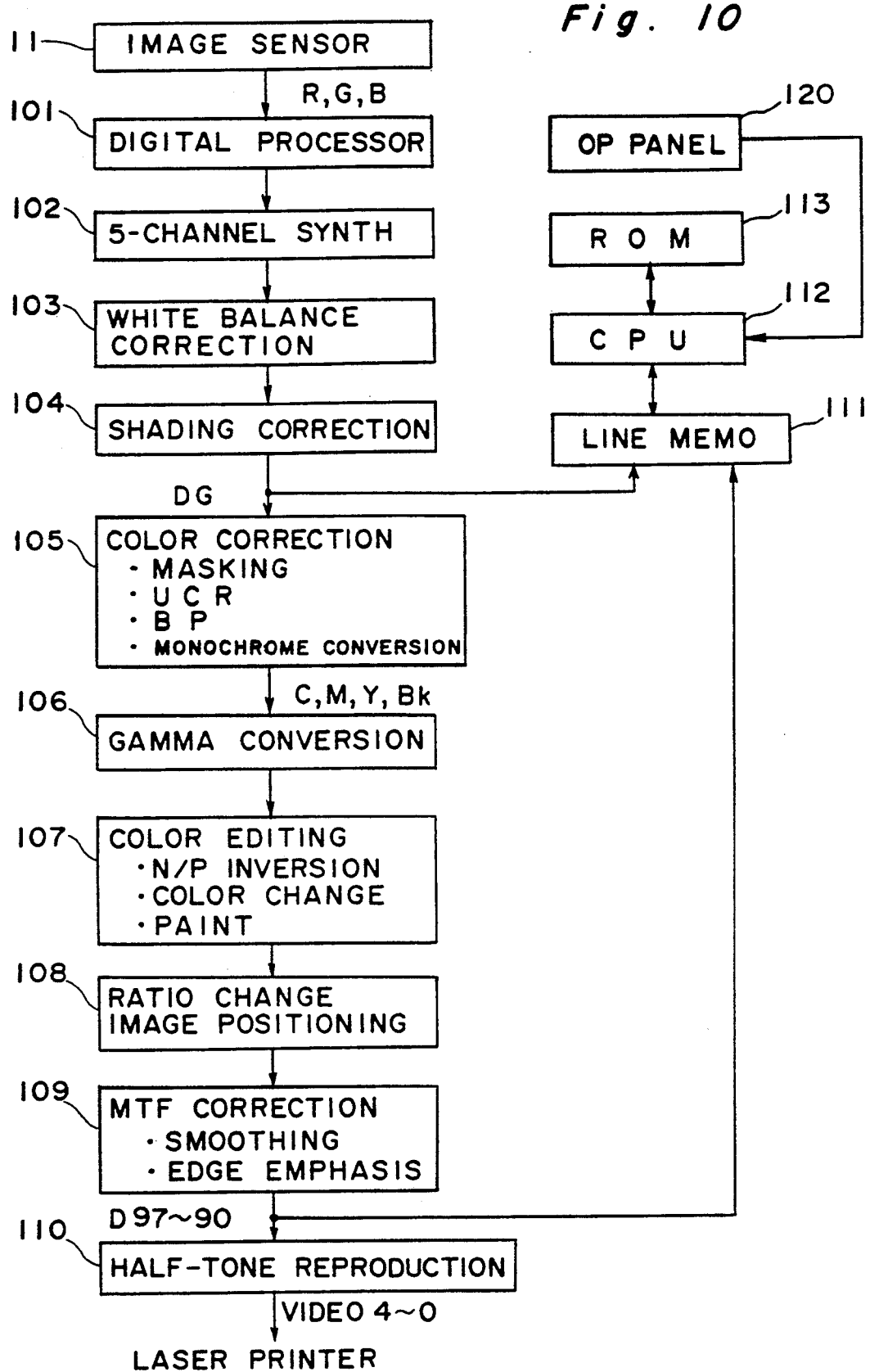
FIG. 10 is a block diagram of the electrical circuitry in the image reader section.

Referring to FIG. 10, a block diagram of the electrical circuitry in the image reader IR is shown.

In order to increase the reading speed of the image sensor 11 in the main scanning direction, the five CCD sensor chips 11a are driven simultaneously, and from each CCD sensor chip 11a, valid read pixel signals for the 2928 pixels are output sequentially. The photoelectric conversion signals output parallelly from the five CCD sensor chips 11a are quantized by the digital processor 101, which contains an A/D convertor, converted to an 8-bit (256 tone) digital data signal, and then converted to a serial signal corresponding to the pixel array by a 5-channel synthesizer 102.

Differences in the spectral sensitivity of each CCD sensor chip 11a are then corrected by the white balance correction circuit 103. The shading correction circuit 104 corrects for variations in light distribution (uneven luminance) in the exposure lamp 17 in the main scanning direction and also corrects for differences in sensitivity between the CCD sensor chips 11a. Thus, from shading correction circuit 104, not the data signal proportional to the intensity of the reflected light as originally obtained, but a density data signal proportional to the density of the original D as obtained by the conversion according to the reading area of the original D is produced.

In color correction circuit 105, various processes are carried out, such as: masking process using the density data of each of the R, G and B scan colors to produce the density data for three primary printing toner colors Y, M and C; UCR processing for the Bk (black) density data; black paint processing; and monochrome conversion processing. A gamma convertor 106 is provided for effecting the gamma conversion based on the density slope and the background color of the original D.

A color editing circuit 107 provides three color image editing functions which are: color changing, painting, and negative-positive inversion.

A copy ratio changing and image positioning circuit 108 provides the processing required to change the output timing and output order of the density data signal or to change the scanning speed in the sub-scanning direction in order to produce enlargements, reductions, mirror image reversals, or other reproductions which differ from the original using thinning, adding, interpolation, or other processing methods. The MTF correction circuit 109 executes an edge emphasis processes to prevent the loss of contour edges and smoothing to prevent the occurrence of moire patterns.

The density data signals D97–90 which have been processed in these various ways as described above are digitized using an area tone method by the half-tone reproduction circuit 110 such that each tone unit area is a dot matrix measuring L×n dots. Then, the digitized signal is sent to the laser printer LP. It should be noted that a line memory 111 is provided for storing the image data during specific processing stages, CPU (central processing unit) 112 is provided for controlling each of the other circuits, and ROM 113 is provided for storing the program and various data, including threshold data SD which will be described below. Note that operation panel 120, in which various control switches are provided, is connected to CPU 112.

Figure 1:
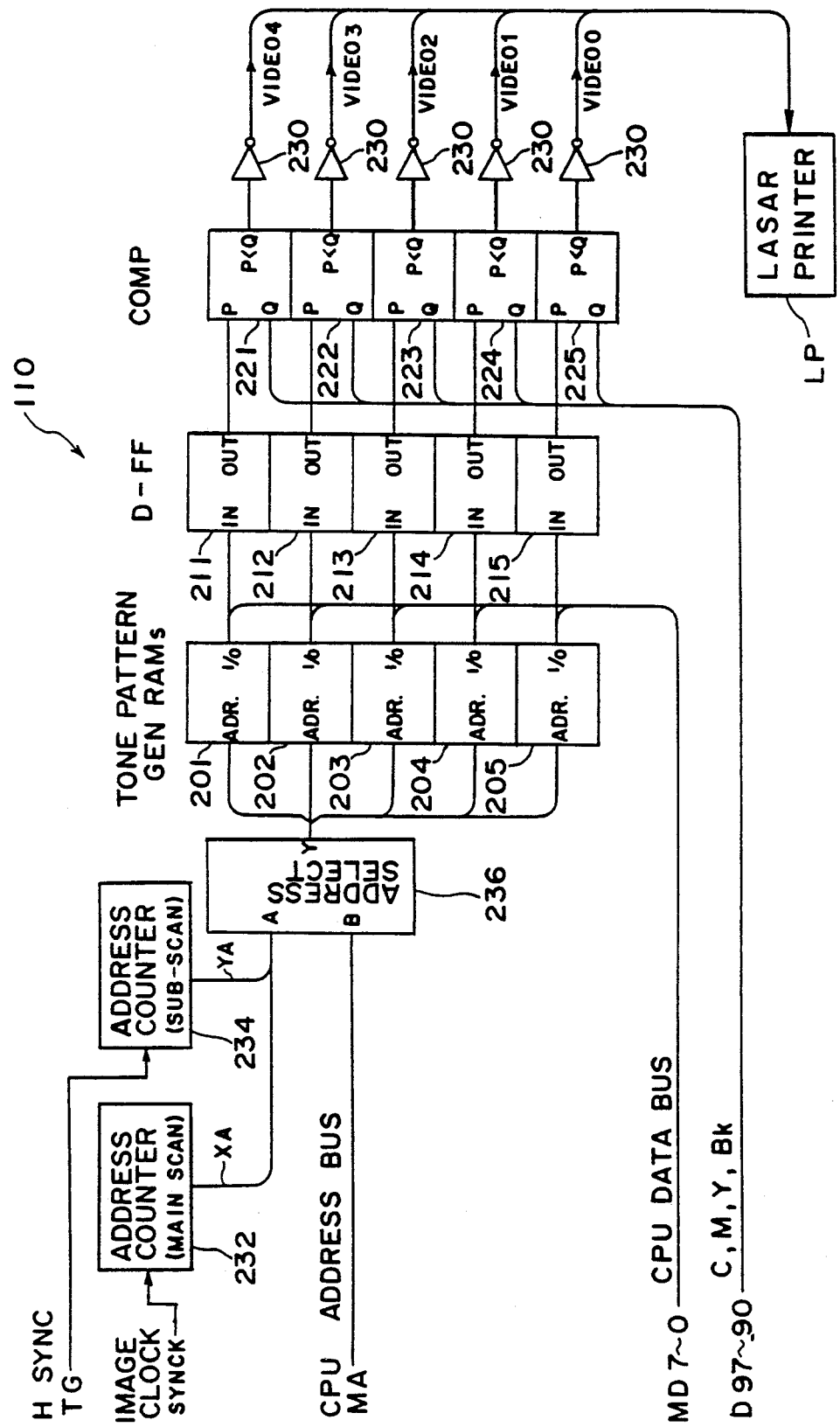
FIG. 1 is a block diagram of the half-tone reproduction circuit.

Referring to FIG. 1, a block diagram of half-tone reproduction circuit 110 is shown.

Half-tone reproduction circuit 110 compares the density data D97–90 from the MTF correction circuit 109 with the threshold data SD (8 bit) read from the ROM 113, and outputs the result in binary form.

The half-tone reproduction circuit 110 also includes tone pattern generator RAMs (hereinafter RAM) 201–205 to temporarily store the threshold data SD; latch circuits 211–215 which latch the threshold data SD read from RAM 201–205 to synchronize with density data D97–90; five comparators 221–225 which compare the threshold data SD from latch circuits 211–215 with the density data D97–90 and output the digitized density data D97–90 as image signals; address counters 232, 234 which generate the address for reading threshold data SD from the RAM 201–205; and an address selector 236 which selects the reading address buses XA and YA for reading from address counters 232 and 234, or write address bus MA for writing from CPU 112.

The RAMs 201–205 are used to store two groups of threshold data SD which are appropriate to tone pattern F and tone pattern G, respectively. These two data groups are respectively suited for forming eight tone reproductions suitable for copying text and line drawings, and 29 tone reproductions suitable for copying photographic images. According to the selected copying mode, the threshold data SD is read from ROM 113 and stored in RAM before scanning of the original D starts in order to form an image based on tone pattern F or G.

The selection of the copying mode, i.e., of either tone pattern F or G, is controlled by the operator using an appropriate switch on the operation panel 120.

When data is read from ROM 113, the address selector 236 selects the CPU write address bus MA. The write address is specified by CPU 112, and RAMs 201–205 are written with the threshold data SD from the CPU data bus MD 7–0.

Figure 2:
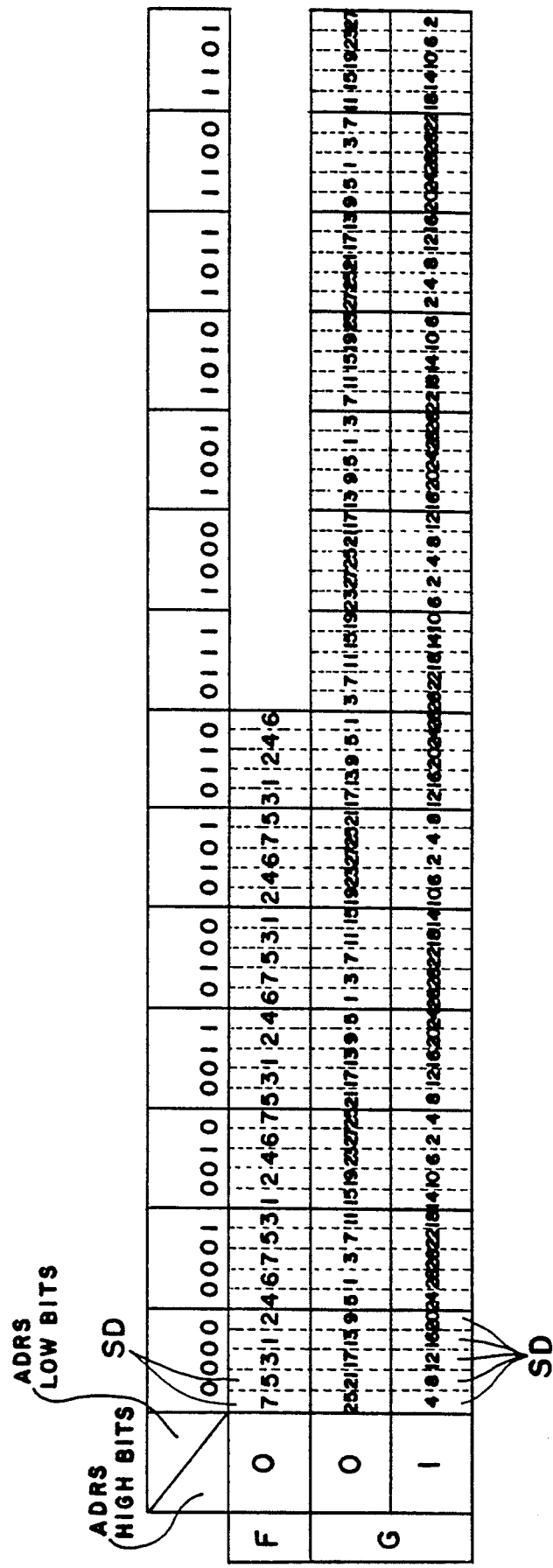
FIG. 2 shows the relationship between the address of the tone pattern generator RAM and the threshold data SD stored in RAM.

Referring to FIG. 2, the relationship between the address of RAMs 201–205 and the threshold data SD stored in RAMs is shown.

RAMs 201–205 all feature the same structure, each having a memory area accessed by a 5-bit address with one threshold data SD being stored per address.

In FIG. 2, five threshold data SD, which are read out from five RAMs 201–205, are shown. For the tone pattern F, the threshold data SD varies between numbers 1 and 7, and for the tone pattern G, the threshold data SD varies between numbers 1 and 28, which number being expressed using binary digits. The thresholds shown in FIG. 2 are aligned in order according to the alignment of RAM 201–205 in which RAM 201 is at the left end and RAM 205 is at the right. A higher or lower number represents a correspondingly higher or lower threshold data SD value.

For example, for the case in which the threshold data SD for tone pattern F is stored in RAMs, the threshold data SD stored in RAMs 201, 202, 203, 204, and 205, respectively, are 7, 5, 3, 1, and 2 for the address 00000 where all 4 LOW bits and the 1 HIGH bit are 0.

When this threshold data SD is read from RAMs 201–205, the address selector 236 shown in FIG. 1 selects the read address buses XA and YA from address counters 232, 234, assigns these to the HIGH and LOW bits, and outputs the data to the address terminals of RAMs 201–205.

The one address counter 232 is incremented by the input of the image clock signal SYNCK determining the transfer timing for the density data D97–90 of one pixel. The other address counter 234 is incremented by the horizontal sync signal TG which is the reference for synchronizing the formation of a single line in the main scanning direction.

The address counters 232 and 234 are initialized by the CPU 112 so that when the threshold data SD for tone pattern F is stored in RAMs 201–205, the address counter 232 counts from 0 to 6, and the other address counter 234 is held in the cleared state. On the other hand, when the threshold data SD for tone pattern G is stored in RAMs 201–205, the address counter 232 counts from 0 to 13, and the other address counter 234 counts from 0 to 1.

Therefore, when the threshold data SD for tone pattern F is stored in RAMs 201–205, the same address is specified every 7 pixels. And, when the threshold data SD for tone pattern G is stored in RAMs 201–205, the same address is specified every 14 pixels for digitization of one line.

With this address specification, the threshold data SD stored in RAMs 201–205 is read one at a time, and the five threshold data SD values read are latched by latch circuits 211–215.

The transfer timing is adjusted and the five threshold data SD values are output from latch circuits 211–215. These values are then compared simultaneously with the density data D97–90 for one pixel commonly applied to the corresponding comparators 221–225 over the density data D97–90 bus.

Thus, the density data D97–90 is digitized based on the threshold data SD, and five binary data are output simultaneously from comparators 221–225. These binary data signals are inverted by inverters 230, and then sent to the laser printer LP as tonal image signals VIDEO 4–0.

Figure 11:
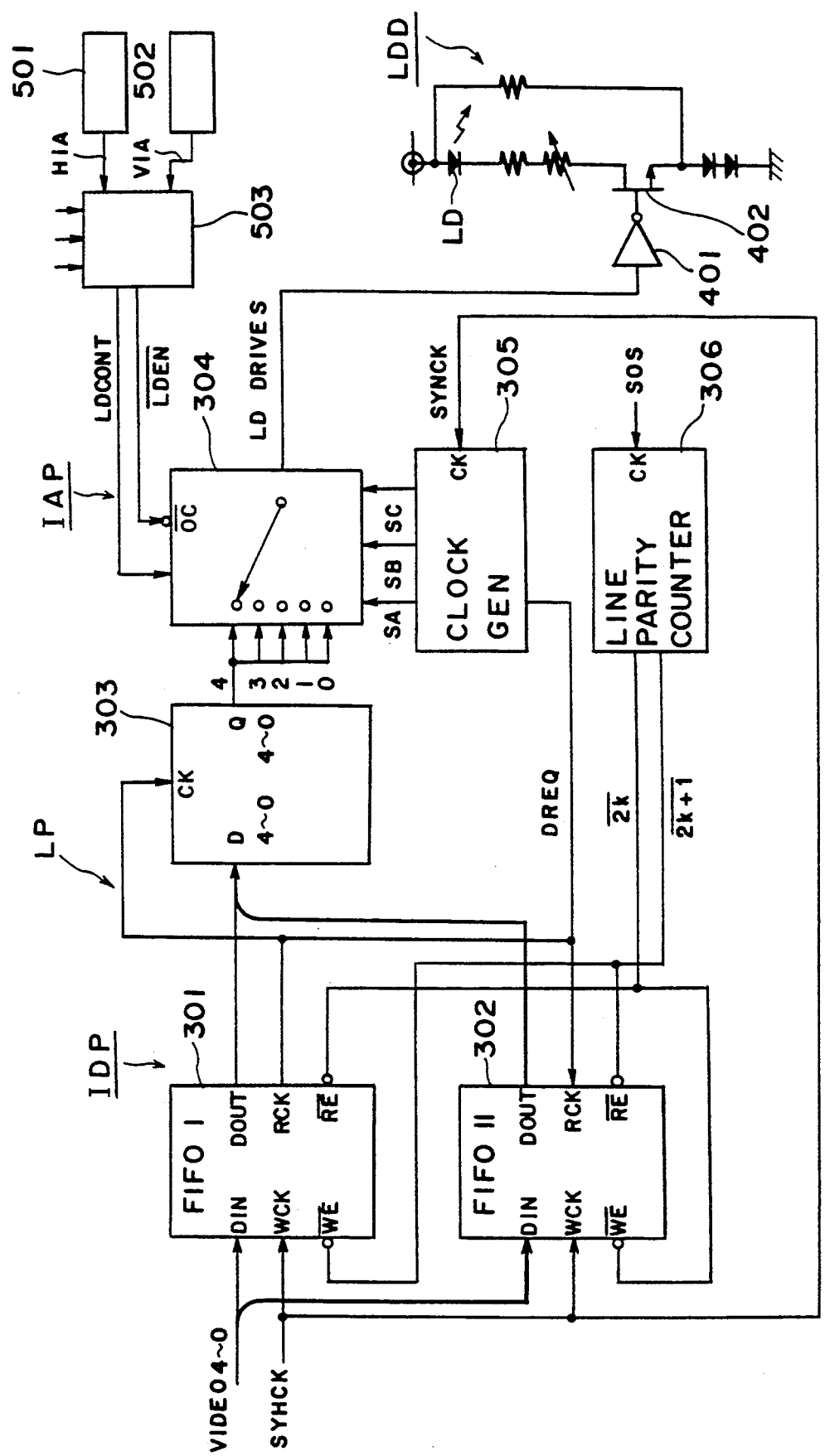
FIG. 11 is a block diagram of the electrical circuitry in the laser printer section.

Referring to FIG. 11, a block diagram of the electrical circuitry in the laser printer LP is shown. This circuitry includes an image data processor IDP, image area processor IAP, and laser driver LDD. The image data processor IDP generates the drive signal for the semiconductor laser LD based on the image signal sent from the image reader IR. The image area processor IAP determines the area in which the image will be formed on the copy paper. The laser driver LDD is the drive circuit for the semiconductor laser LD.

The image data processor IDP is comprised of first-in first-out FIFO memory blocks 301 and 302 which store the binary data output from the image reader IR and output the data in the order in which it was input; a latch circuit 303 which latches the binary signals read from FIFO memory blocks 301 and 302; a selector 304 which successively selects the five binary data output in series from the latch circuit 303 and produces a serial image signal; and a line parity counter 306 which outputs a write enable signal $\overline{WE}$ and read enable signal $\overline{RE}$ to the clock generator 305 and the FIFO memory blocks 301 and 302.

Referring to FIGS. 12(a) and 12(b) timing charts are shown illustrating the operation of the image data processor IDP.

Referring to FIG. 11 and FIGS. 12(a) and 12(b), FIFO memory blocks 301 and 302 alternately execute a write and read operation for the binary data sent as a 5-bit parallel signal from comparators 221-225 of image reader IR at each line in the sub-scanning direction. The write and read operations are respectively synchronized to the image clock signal SYNCK, and the data request signal DREQ from clock generator 305.

The line parity counter 306 generates an odd line enable signal $\overline{2k+1}$ and an even line enable signal $\overline{2k}$ for switching operation at the completion of each line based on the laser beam detection signal SOS which determines the position of image formation in the main scanning direction.

The binary data VIDEO 4-0 signals read from FIFO memory blocks 301 and 302 are applied to selector 304 as a 5-bit parallel signal via the latch circuit 303. In other words, five binary data VIDEO 4-0 signals for each one pixel of the original image are simultaneously input to selector 304 at each cycle of the image clock signal SYNCK.

The selector 304 generates dot timing signals S1-S5 (see FIG. 12 (b)) shifted 1/5 cycle from the image clock signal SYNCK based on the timing signals SA, SB, SC output by clock generator 305. As a result, the binary data VIDEO 4-0 signals are successively selected to generate a serial image signal which is output to laser driver LDD as the drive signal.

As thus described, the present embodiment features five comparators 221-225 in which five threshold data read from the tone pattern generator RAMs 201-205 are simultaneously compared with the density data for one pixel in the original image as read by the image sensor, and five binary data VIDEO 4-0 signals are output in parallel. The selector 304 successively selects this binary data and outputs a serial image signal. It is thus possible to shorten the processing time required for image data digitizing, and a serial image signal can be output at high speed.

In the laser driver LDD, the serial image signal from the image data processor IDP is inverted by the inverter 401, switched by FET 402, and emissions from the semiconductor laser LD are thus controlled.

When the serial image signal is LOW, FET 402 is on and the semiconductor laser LD emits a beam. The photoconductive drum 1 is thus exposed as previously described.

The image area processor IAP is comprised of counters 501 and 502, the value of each of which changes as the copy paper size changes, and a logic circuit 503 which generates a laser diode enable signal $\overline{LDEN}$ and laser diode control signal LDCONT based on the output signal HIA of counter 501 showing the image area in the main scanning direction, and the output signal VIA of counter 501 showing the image area in the sub-scanning direction. It is thereby possible to define the image formation area in both the main and sub-scanning directions on the copy paper.

The formation of a half-tone reproduction in a digital photocopier A thus constructed is described below.

Figure 3:
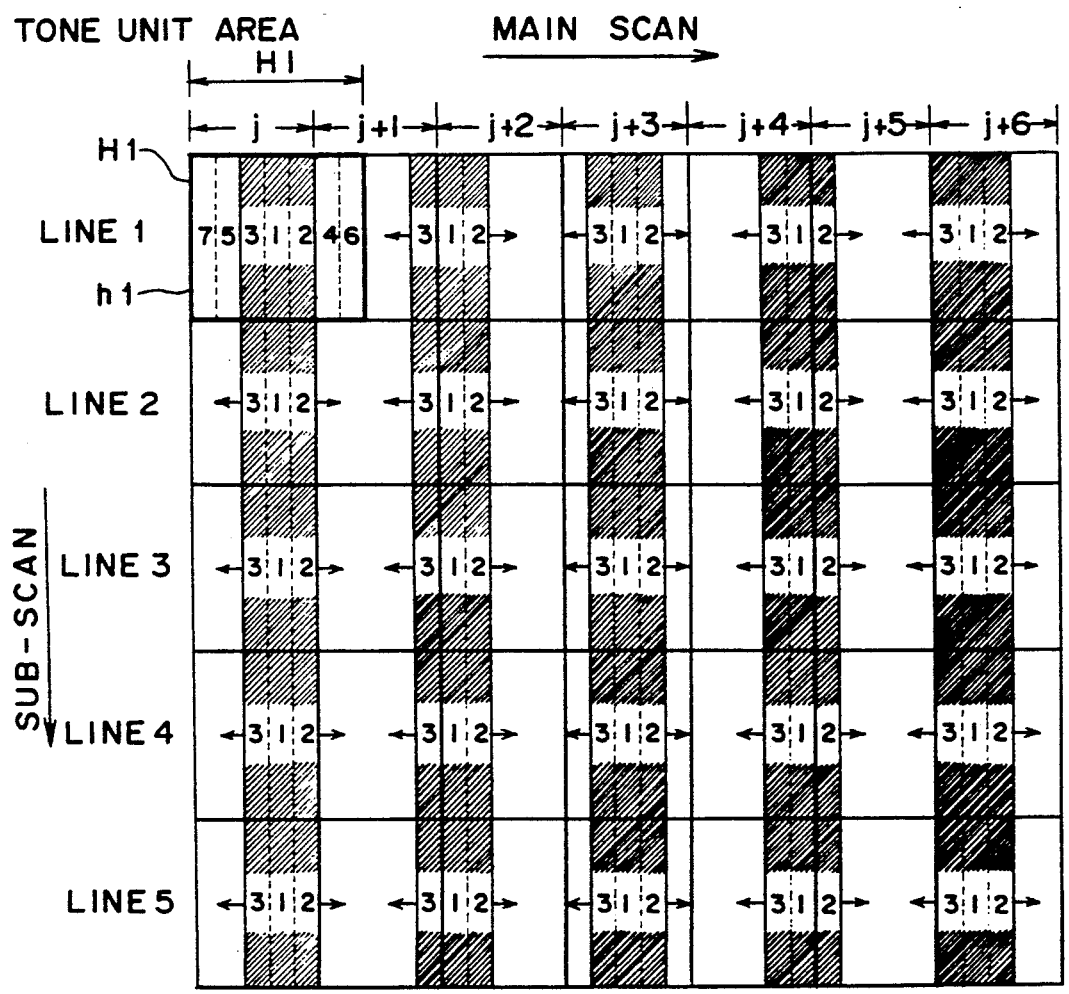
FIGS. 3 and 4 are plane figures showing the copy image.
Figure 5:
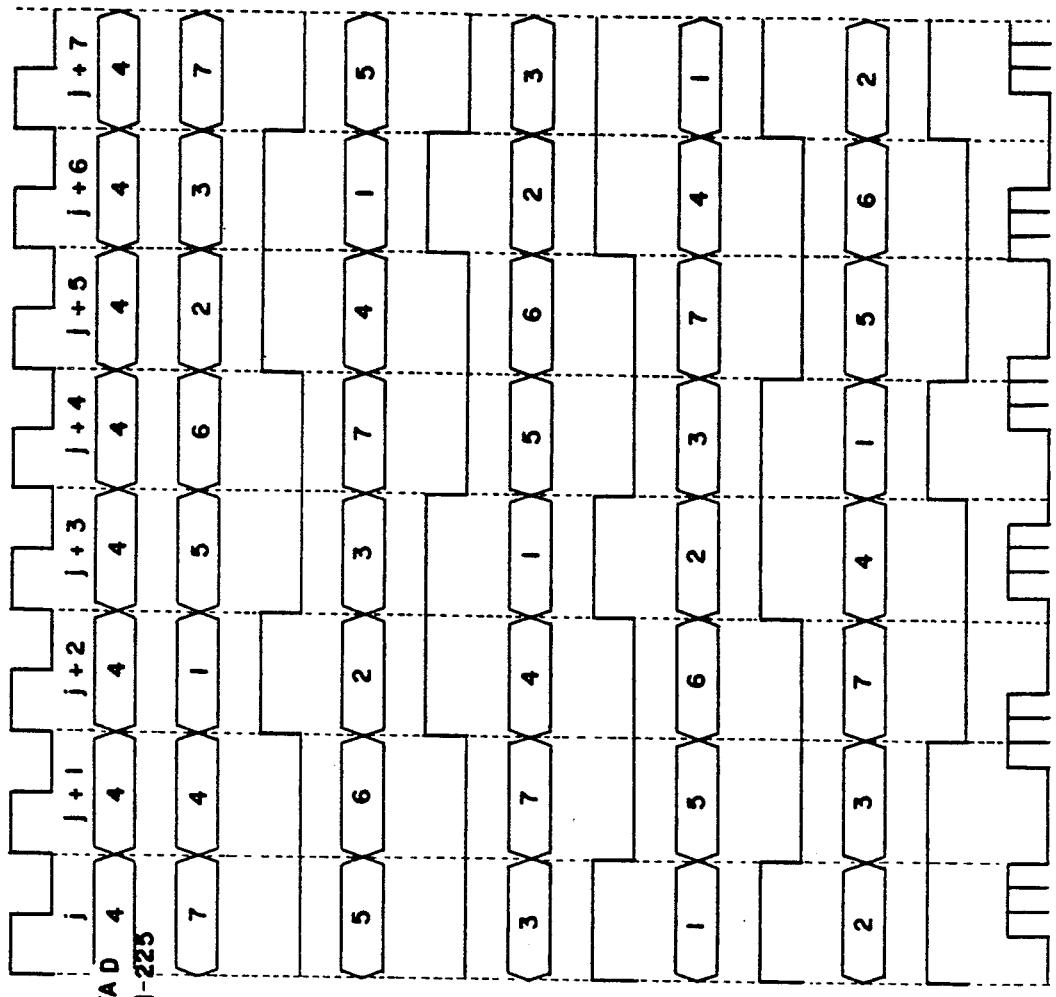
FIG. 5 shows the relationship between the comparator input and output.

FIG. 3 shows the copy image using the threshold data SD group for the tone pattern F and, FIG. 5 shows the relationship between the input and output values of comparators 221-225. In each of these figures, the values shown represent correspondingly to the values for density data D97-90 and threshold data SD. The output of selector 304 for each pixel j, j+1 . . . j+7 is also shown in FIG. 5.

When copying with tone pattern F, one threshold data SD group of seven threshold data SD values from 1-7 is stored at each of RAMs 201-205 as previously described. The tone unit area H1 in the copy image in this case is a dot matrix of 7×1 dots, making it possible to produce half-tone reproductions with 8 (=7×1+1) tones.

The comparators 221-225 output a HIGH signal when the value of the density data D97-90 applied commonly to input terminals Q is greater than the value of the threshold data SD applied to each input terminal P. Therefore, as shown in the figure, when the value of any of density data D97-90 for each pixel j, j+1 . . . j+7 at lines 1-5 is "4", the output of each comparator 221-225 is HIGH if the value of the threshold data SD is less than or equal to "3".

The shaded areas in FIG. 3 indicate the display dots where toner of one color Y, M, C and Bk adheres. The white areas show dots where the color of the paper itself shows through and there are no display dots. In the example shown in the figure, the dots corresponding to threshold data SD values "1"-"3" are display dots. However, if the density data D97-90 is "5", the dot indicated by "4" to the right of the "2" would also become a display dot, and if the density data D97-90 is "6", the dot indicated by "5" to the left of the "3" would also become a display dot. In other words, since the area tone method of the present embodiment smooths the transition in the values of the threshold data SD corresponding to each dot in the main scanning direction, the number of display dots increases, as the original D becomes darker, alternately on both sides of one display dot as shown by the arrows in the figure within the image area h1 equal to the tone unit area H1.

Therefore, even if the same threshold data SD group is used repeatedly, characteristic edge patterns caused by extreme shifts in the threshold values in the copy image do not appear regularly, and smooth half-tone reproductions can be created.

Figure 4:
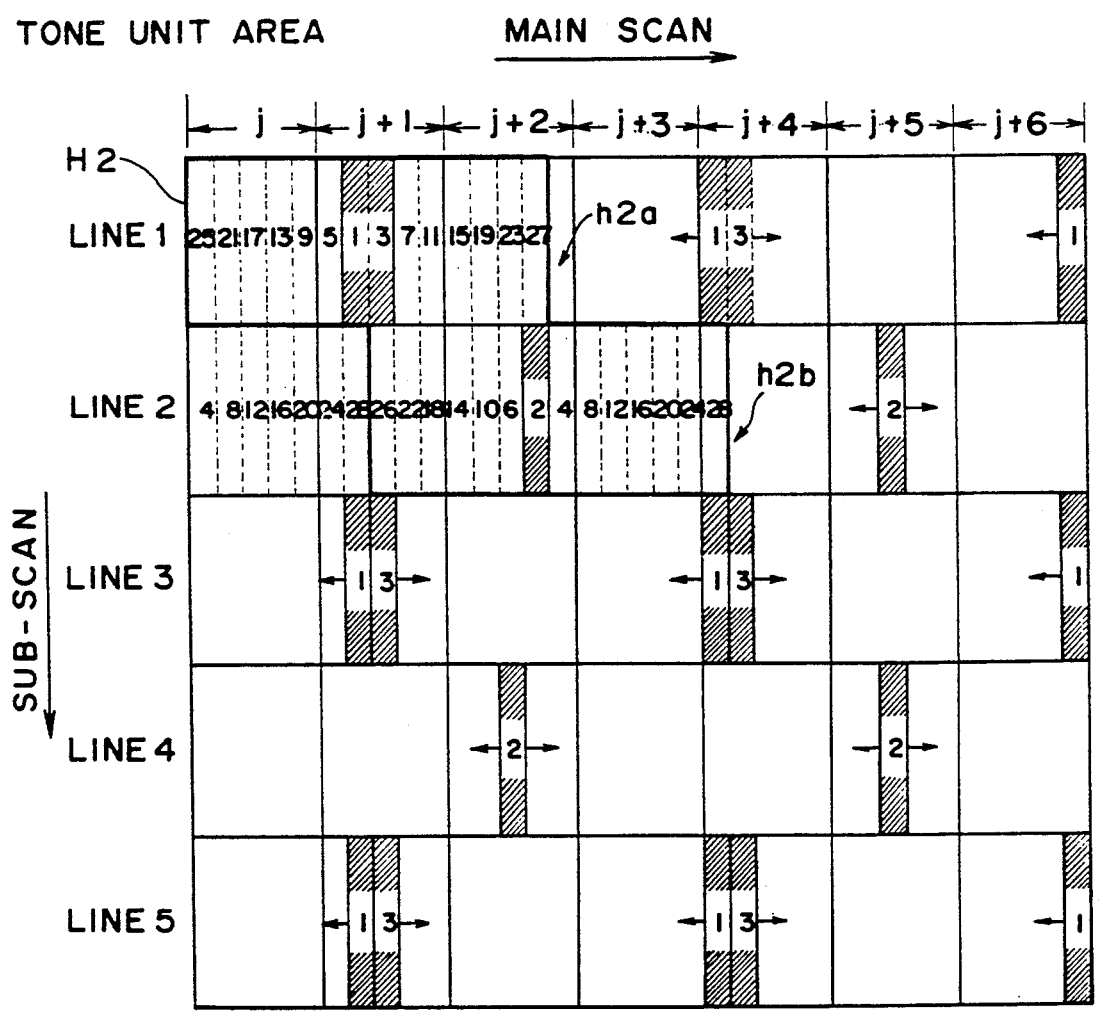

FIG. 4 shows a copy image using the threshold data SD group for tone pattern G.

When using tone pattern G, the tone unit area H2 is a dot matrix of 14×2 dots formed by image area h2a, which is formed from the odd number lines, and image area h2b, which is formed from the even number lines. As a result, 29 tone images can be reproduced.

In this case, as the original D becomes darker, the display dots in image areas h2a and h2b increase alternately between the two image areas. When image areas h2a and h2b are examined separately, however, the number of display dots increases alternately as the original D becomes darker just as in the case with tone pattern F.

As can be understood from FIGS. 3 and 4, in the tone unit areas H1 and H2, the number of dots (7 or 14) comprising the image area h1, h2a, or h2b (which is a single series in the horizontal (main scanning) direction of the matrix) is not an integral multiple of the number of dots (5) corresponding to a single pixel. In other words, a single tone unit area H1 or H2 does not correspond to an integral number of pixels.

When it is defined such that:
"x": the number of pixels per main scanning direction unit length during reading,
"y": the number of pixels per sub-scanning direction unit length,
"m": the number of dots equal to one pixel,
"L": the number of lines in the dot matrix, and
"n": the number of columns in the dot matrix (x, y, m, L, and n are natural numbers), the interrelationship between these values can be expressed with formula (1) below:

$$mx/(L+1) \leq y/n \leq mx/(L-1).  \quad (1)$$

By thus selecting the number of dots in the matrix of the single tone unit area H1 or H2 so as to meet the condition of formula (1), the single tone unit area H1 or H2 is an approximate rectangle, and the resolution in the lateral and longitudinal (sub-scanning direction) directions of the copy will be approximately equal, even when the scanning resolution is different in the main and sub-scanning directions of original D.

According to the embodiment of the present invention, $x=16$, $y=12$, $m=5$, $L=7$, and $n=1$ when applying tone pattern F; and $x=16$, $y=12$, $m=5$, $L=14$, and $n=2$ when applying tone pattern G. Therefore, when making a same-size (1:1 copy ratio) copy, the lateral and longitudinal resolutions with tone pattern F are approximately 11.4 dots/mm and 12 dots/mm, respectively; with tone pattern G, these are approximately 6.8 dots/mm and 6 dots/mm, respectively. In both cases, the difference in lateral and longitudinal resolutions is slight.

According to the embodiment as described above, threshold data SD groups for the two tone patterns are stored in ROM 113. Before scanning original D, the threshold data SD group to be used for digitization of the density data D97-90 of the image is read from ROM 113 according to the selected tone pattern and sent to RAMs 201-205. The threshold data SD group is then read from RAMs 201-205 while the image is scanned for real-time digitization.

Therefore, because it is not necessary for ROM 113 to be a high-speed ROM device, it is not necessary to use, for example, high power consumption, expensive, bipolar ROM devices. Accordingly, slow ROM devices, MIS EPROM for example, can be used to achieve a low cost, low power consumption device.

According to the preferred embodiment as described above, one pair of address counters 232 and 234 for the main scanning and sub-scanning directions is used to read the threshold data SD stored in the multiple tone pattern generator RAMs 201-205, and these address counters 232 and 234 are initialized by CPU 112 control according to changes in the address resulting from differences in the tone pattern. The circuit construction is thereby simplified, peripheral circuitry can be unified, and the same devices can be used for multiple tone patterns.

In the preferred embodiment described above, five dots are assigned to each one pixel used in the reproduction of the original image, but any other number of dots greater than or equal to two dots per pixel may also be assigned.

In an imaging device according to the present invention, it is possible to produce half-tone reproductions with approximately equal resolution in the lateral and longitudinal directions even when the pixel density of the original image differs in the lateral and longitudinal directions.

Furthermore, according to the present invention, because one display dot is increased on alternating sides of a display dot through a unit image area equal to the number of dots L in the L×n dot matrix tone unit area as the density of the original image increases, regular edge patterns which cause image quality degradation are not produced, and smooth half-tone reproductions as faithful as possible to the density of the original image can be produced.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image data processing device for producing printing data which is used for printing a half-tone image corresponding to an image information that contains a plurality of density data comprising
   a threshold pattern generating means for generating a threshold pattern which is a repetition of a basic pattern including a predetermined number "L" of thresholds; and
   a comparing means for comparing respective density data with a predetermined number "M" of thresholds selected from the number "L" of the thresholds in which "L" is not an integer multiple of "M", and for producing, based on the comparison, a predetermined number "M" of print data corresponding to the respective density data.

2. A method for transforming an image information corresponding to image density which contains a half-tone level into binary data, the image information containing a plurality of density data corresponding to a plurality of pixels defined by a fractionalization of an original image, the method comprising the steps of:
   generating a threshold pattern which is a repetition of a basic pattern including a predetermined number "L" of thresholds;
   comparing respective density data each of which corresponds to one pixel, with a predetermined number "M" of thresholds selected from a number "L" of thresholds in which "L" is not an integer multiple of "M"; and producing, based on the comparison, a predetermined number "M" of binary data corresponding to the respective density data.

3. A method for transforming an image information corresponding to image density which contains a halftone level into binary data and for providing the binary data to a printer, the image information containing a plurality of density data corresponding to a plurality of pixels defined by a fractionalization of an original image, the method comprising the steps of:

generating a threshold pattern which is repetition of a basic pattern including a predetermined number "L" of thresholds;

comparing respective density data each of which corresponds to one pixel with a predetermined number "M" of thresholds selected from a number "L" of thresholds in which "L" is not an integer multiple of "M";

producing, based on the comparison result, a predetermined number "M" of binary data corresponding to the respective density data;

selecting serially said "N" binary data; and providing said selected binary data to the printer.

4. An image forming device which can form an image by printing a plurality of dots based on the image information that contains a plurality of density data corresponding to a plurality of pixels defined by fractionalization of an original image, and which can express a density of an image by controlling a number of dots to be printed within a predetermined tone unit area, said image forming device comprising:

a threshold pattern generating means for generating a threshold pattern which is a repetition of a basic pattern including a predetermined number "L" of thresholds;

a comparing means for providing a comparison of respective density data with a predetermined number "M" of thresholds selected from the number "L" of the thresholds in which "L" is not an integer multiple of "M", and for producing, based on the comparison, a predetermined number "M" of print data corresponding to the respective density data; and printing means for printing on a printing sheet dots corresponding to said "M" print data in a line along a main scanning direction.

5. The image forming device as claimed in claim 4, wherein said printing means forms an image on said sheet by a raster scan operation.

6. The image forming device as claimed in claim 4, wherein said threshold pattern generating means generates, within data group including "L" thresholds corresponding to said tone unit area, said threshold pattern such that the thresholds increase alternately and sequentially on both sides from one threshold.

7. The image forming device as claimed in claim 1, further comprising a selecting means for selecting serially said "M" print data and for providing said print data serially to said printing means.

8. An image forming device for printing a plurality of dots on a printing sheet, in which a plurality of pixels are defined by a fractionalization of an original image in two orthogonal directions, which are main scanning direction and sub-scanning direction, each pixel corresponding to a predetermined number "M" of dots aligned in a line, and a predetermined number of thresholds being assigned correspondingly to said dots for obtaining a predetermined number of binary data by a comparison between said thresholds and a density data of each pixel based on said original image, said image forming device comprising:

a memory means for storing a threshold pattern defined by a plurality "L×N" of thresholds aligned "L" by "N" with a direction of alignment of "L" thresholds corresponding to a direction of alignment of "M" dots, in which "L" is not an integer multiple of "M";

a comparing means for comparing density data corresponding to one pixel and "M" thresholds read out from said memory means, and for producing binary data correspondingly to each dot; and printing means for printing dots in accordance with said binary data obtained from said comparing means.

9. The image forming device as claimed in claim 8, wherein said comparing means reads said "M" thresholds from said memory means and compares said "M" thresholds with one density data at a same time.

* * * * *